3,632,607
PROCESS FOR PURIFYING KALAFUNGIN
Heinz F. Meyer, Portage, Mich., assignor to The Upjohn Company, Kalamazoo, Mich.
No Drawing. Filed July 10, 1968, Ser. No. 743,594
Int. Cl. C07d 5/06
U.S. Cl. 260—343.6                                    8 Claims

ABSTRACT OF THE DISCLOSURE

Process for purifying an impure preparation of kalafungin which comprises hydrolyzing the kalafungin in the impure preparation and forming a kalamycinate salt, acidifying and back-extracting the kalamycinic acid from the reaction mixture with an organic solvent, and lactonizing kalamycinic acid to kalafungin. Kalafungin, also known as kalamycin, is disclosed in U.S. Pat. 3,300,382 as a useful antibiotic.

BRIEF SUMMARY OF THE INVENTION

Kalafungin, a useful antibiotic, is produced by a fermentation process as described in U.S. Pat. 3,300,382. In such a process kalafungin is extracted with an organic solvent from fermentation beers containing from 5–20 mcg./ml. bioactivity. The resulting solvent extracts therefore contain kalafungin with large amounts of impurities. These extracts are subjected to chromatographic procedures, i.e., silica gel chromatography and partition column chromatography, to obtain pure kalafungin. As is readily apparent to those skilled in the antibiotic art, the above purification procedures are not ideal for the production of large amounts of an antibiotic such as kalafungin. The purification process disclosed herein, however, is ideally suited to the production of large amounts of kalafungin.

The process of the subject invention is an improved process for purifying an impure preparation of kalafungin. In the subject process, the kalafungin in an impure preparation of kalafungin is hydrolyzed with a base to form a solution of the base salt of kalamycinic acid. This salt is converted to the acid form by acidifying the salt solution. When this acidification is coupled with a back-extraction using an organic solvent for kalamycinic acid, there is obtained an organic extract containing kalamycinic acid. The extract is concentrated to remove water from the solvent, and the kalamycinic acid in the residue is lactonized to kalafungin with a concentrated inorganic acid. For example, upon hydrolysis of kalafungin, present in an impure preparation of kalafungin, with sodium hydroxide at about pH 12 there is obtained a solution of sodium kalamycinate. Upon acidifying this solution with aqueous hydrochloric acid to a pH of about 3 in the presence of butyl acetate, and separating the organic phase from the aqueous phase, there is obtained an organic extract containing kalamycinic acid. This extract is concentrated, then treated with concentrated hydrochloric acid in the presence of butyl acetate to produce pure kalafungin. This process can be illustrated as follows:

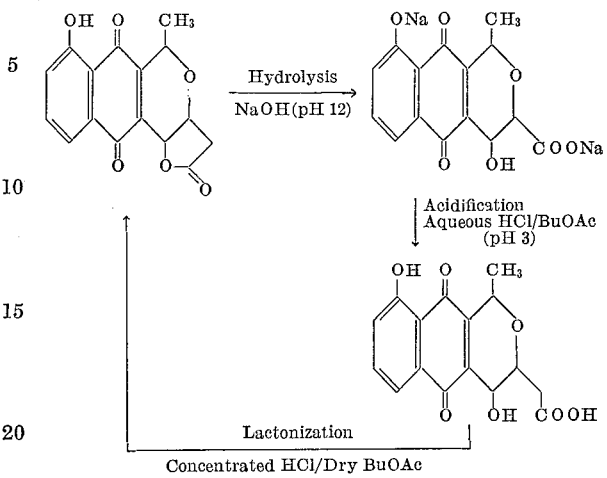

DETAILS OF THE INVENTION

Upon treating an impure preparation of kalafungin with a base, for example, sodium hydroxide (preferred), potassium hydroxide, calcium hydroxide, barium hydroxide, and the like, there is obtained an impure preparation of a base salt of kalamycinic acid. For example, upon treating a methylene chloride extract of a kalafungin fermentation beer with sodium hydroxide at a pH about 12, there is obtained an impure preparation of sodium kalamycinate.

The impure preparation of kalafungin can be subjected to alkaline hydrolysis directly, or, alternatively, if in a dry form, can be placed in solution before the hydrolysis by dissolving the preparation in an organic solvent, for example, ethyl acetate, amyl acetate, butyl acetate, and like aliphatic esters; acetone, methyl ethyl ketone, isopropyl butyl ketone, and like lower alkanones; chloroform, methylene chloride, and like halogenated hydrocarbons; and dimethyl sulfoxide. It is necessary to use an organic solvent, as described above, since kalafungin is relatively insoluble in water. Kalamycinic acid is generally soluble in the same solvents as kalafungin.

The alkaline hydrolysis can be carried out with a base, as disclosed above. The pH of the reaction can be varied, but at pH's lower than 12, i.e., 10, it has been found that the hydrolysis proceeds at a slower rate. Hydrolysis at pH 12 is preferred since the reaction is reasonably rapid and no undesirable degradation of the kalafungin molecule is detectable.

The time of the reaction will vary between a few seconds and several hours depending upon the strength of the base used. Also, the temperature of the reaction can be within a range of 0° to 50° C. (room temperature is preferred).

Upon acidification of the hydrolysis reaction mixture in the presence of an organic solvent for kalamycinic acid, as described above, kalamycinic acid is back-extracted into the organic solvent. For example, upon adjusting the pH of a hydrolysis reaction mixture containing sodium kalamycinate, to a pH of about 3 with aqueous hydrochloric acid, in the presence of butyl acetate, kalamycinic acid is back-extracted into the butyl acetate.

Other inorganic acids which can be used in the back-extraction, described above, are sulfuric acid, phosphoric acid, nitric acid, and the like. Any of the solvents in which kalafungin is soluble, as disclosed previously, can be used in the back-extraction. Butyl acetate is preferred.

Advantageously, the pH range for the above reaction is a pH of about 2 to about 4. A pH of about 3 is preferred since at this pH there is an essentially complete conversion of the salt of kalamycinic acid to kalamycinic acid.

The hydrolysis reaction mixture, described above, also can be converted directly to a precipitate consisting of kalamycinic acid. This is accomplished by merely acidifying the hydrolysis reaction mixture and omitting the back-extraction with an organic solvent. Kalamycinic acid which does not precipitate out can be extracted from the mother liquor with an organic solvent for kalamycinic acid. Though the above-disclosed acidification step gives overall process yields comparable to the use of an acidification and back-extraction step, as previously described, the acidification and back-extraction step is preferred.

Kalamycinic acid is lactonized to kalafungin by treating the kalamycinic acid organic extract, or the kalamycinic acid precipitate, described above, dissolved in an organic solvent, with concentrated mineral acid, for example, hydrochloric acid (preferred), sulfuric acid, and the like. For example, upon treating a kalamycinic acid butyl acetate extract with concentrated hydrochloric acid at room temperature there is obtained a pure preparation of kalafungin.

In order to obtain high yields of pure kalafungin in the subject process, it is critical that the lactonization reaction be carried out in a solvent for kalafungin, as described above. Solvents, such as alcohols, will not given high yields of pure kalafungin. For example, when kalamycinic acid is lactonized with an acid in the presence of an alcohol of from 1 to 4 carbon atoms, the yield of kalafungin is only about 37%. In contrast, the yield of kalafungin in the subject process is 90% or better from kalamycinic acid. Overall yields of pure kalafungin from crude preparations of kalafungin have ranged about 70% or higher in the subject invention process.

The subject purification process also can be used to purify other lactone compounds which contain groups not sensitive to acids or bases. For example, the subject process can be used to purify $\alpha$-pyrones, coumarins, and such natural products as kawain, or the aflatoxins.

The following examples are illustrative of the process of the present invention but are not to be construed as limiting. All percentages of materials used are by weight and all solvent mixture proportions are by volume unless otherwise noted.

EXAMPLE 1

A crude preparation of kalafungin, obtained as disclosed in Example 1, Part B, of U.S. Pat. 3,300,382, is dissolved in a minimum of methylene chloride. The pH is adjusted to about 12 with sodium hydroxide and the solution extracted with about 60 ml. of water/g. of kalafungin. The extraction is completed when no more of the purple phenolate is visible in the aqueous phase. (Usually the second extraction contains only traces of the phenolate.) The aqueous phase is adjusted to a pH of about 3 with aqueous hydrochloric acid and then back extracted with three ½-volumes of n-butyl acetate. The n-butyl acetate extracts are combined and concentrated. Concentrated hydrochloric acid (0.5%) is added and the solution permitted to stand for about 2 hours at room temperature. The solution is then concentrated under reduced pressure to yield pure crystals of kalafungin having a melting point of 160–165° C. The yield is about 72% of kalafungin. The upgrading of the crude kalafungin preparation is about ten-fold.

The progress of the lactonization step of the above process can be checked by thin-layer chromatography on silica gel with a solvent system consisting of methanol: chloroform (5:95).

EXAMPLE 2

A filtered kalafungin fermentation beer, as disclosed in Example 1 of U.S. Pat. 3,300,382, is extracted with n-butyl acetate. The organic phase is separated from the aqueous phase. Water (60 ml. of water per gram of kalafungin) is added to the organic phase and the mixture is adjusted to a pH of about 12 with aqueous sodium hydroxide. Crude kalamycinic acid is precipitated by adjusting the aqueous extract to about pH 3 with aqueous hydrochloric acid. This precipitate is isolated, dried, and redissolved in a minimum of dioxane. Concentrated hydrochloric acid (0.5% of the volume of dioxane solution) is added and the solution allowed to stand for about 2 hours after which kalafungin forms. The compound is isolated by evaporating the solvent under reduced pressure. Recrystallization is accomplished from n-butyl acetate.

EXAMPLE 3

Crude solid kalafungin is dissolved in a minimum of 0.1 N NaOH. The solution is filtered and then acidified with aqueous hydrochloric acid. A precipitate which forms is collected, washed with water, dried, and redissolved in a minimum of n-butyl acetate. Concentrated hydrochloric acid (0.5% of the volume of n-butyl acetate solution) is added, and the solution allowed to stand for about two hours at room temperature. The solution is then concentrated under reduced pressure to yield crystals of kalafungin.

EXAMPLE 4

By substituting crude preparations of $\alpha$-pyrones, or coumarins, or kawain, or aflatoxins for the crude preparation of kalafungin in Example 1 there are obtained purified preparations of said compounds.

What is claimed is:

1. A process for purifying an impure preparation of kalafungin, prepared by biofermentation method, which comprises:
    (a) alkaline hydrolysis of the kalafungin in an impure preparation of kalafungin to form a kalamycinate salt solution;
    (b) acidification and back-extraction of said kalamycinate salt solution with an organic solvent for kalamycinic acid to give an organic solvent containing kalamycinic acid; and,
    (c) lactonization of said kalamaycinic acid to kalafungin.

2. A process for purifying an impure preparation of kalafungin, prepared by biofermentation method, according to claim 1, which comprises:
    (a) hydrolyzing the kalafungin present in an impure preparation of kalafungin with a base at about a pH of 10 to 12 to obtain a kalamycinate salt solution;
    (b) acidifying said kalamycinate salt solution to a pH of about 2 to 4 and back-extracting said acidified kalamycinate salt solution with an organic solvent for kalamycinic acid to obtain an organic extract containing kalamycinic acid;
    (c) concentrating said organic extract containing kalamycinic acid; and,
    (d) lactonizing said concnetrated extarct with a concentrated inorganic acid in the presence of an organic solvent for kalafungin to obtain pure kalafungin.

3. A process for purifying an impure preparation of kalafungin, prepared by biofermentation method, according to claim 1, which comprises:
- (a) hydrolyzing the kalafungin present in an impure preparation of kalafungin with sodium hydroxide at a pH of about 12 to obtain a sodium kalamycinate solution;
- (b) acidifying said sodium kalamycinate solutions to a pH of about 3 and back-extracting with butyl acetate to obtain a butyl acetate extract containing kalamycinic acid;
- (c) concentrating said butyl acetate extract containing kalamycinic acid; and,
- (d) lactonizing the kalamycinic acid in said concentrated butyl acetate extract to kalafungin.

4. A process, according to claim 3, wherein the lactonization of kalamycinic acid to kalafungin comprises treatment of concentrated butyl acetate extract containing kalamycinic acid with a concentrated inorganic acid in the presence of a solvent for kalafungin.

5. A process, according to claim 4, wherein the concentrated inorganic acid in hydrochloric acid.

6. A process, according to claim 4, wherein the lactonization is carried out in the presence of dry butyl acetate.

7. A process for purifying an impure preparation of kalafungin, prepared by biofermentation method, which comprises:
- (a) alkaline hydrolysis of the kalafungin in an impure preparation of kalafungin to form a kalamycinate salt solution;
- (b) acidification of said kalamycinate salt solution to give a crude kalamycinic acid precipitate; and,
- (c) lactonization of said kalamycinic acid to kalafungin.

8. A process for purifying an impure preparation of kalafungin, prepared by biofermentation method, according to claim 7, which comprises:
- (a) hydrolyzing the kalafungin present in an impure preparation of kalafungin with a base at a pH of about 10 to 12 to obtain a kalamycinate salt solution;
- (b) acidifying said kalamycinate salt solution to a pH of about 3 with aqueous hydrochloric acid to give a crude kalamycinic acid precipitate; and
- (c) lactonizing said kalamycinic acid with a concentrated inorganic acid in the presence of an organic solvent for kalafungin to obtain pure kalafungin.

References Cited
UNITED STATES PATENTS 3,300,381    1/1967    Bergy et al. _____ 424—181

OTHER REFERENCES

Fowler et al., J. Chem. Soc. 1950, pp. 3642 to 3645.

Rodd, Chemistry of Carbon Compounds, vol. III, Part B, p. 1018, Elsevier Publishing Co. (1956).

Dean, Naturally Occurring Oxygen Ring Compounds, pp. 84 and 99 to 100, Butterworths, London, England (1963).

Borsche et al., Ber. Deut. Chem. vol. 62, pp. 368 to 373 (1929).

Borsche et al., Ber. Deut. Chem. vol. 63, pp. 2414 to 2417 (1930).

JOHN D. RANDOLPH, Primary Examiner

U.S. Cl. X.R.

424—279; 260—240 D, 343.2, 343.5, 345.2

UNITED STATES PATENT OFFICE
CERTIFICATE OF CORRECTION

Patent No. 3,632,607        Dated January 4, 1972

Inventor(s) Heinz F. Meyer

It is certified that error appears in the above-identified patent and that said Letters Patent are hereby corrected as shown below:

Column 2, line 8, for " 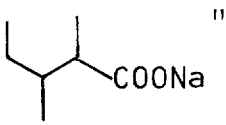 " read -- 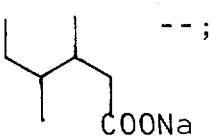 --;

line 30, for "pH about" read -- pH of about --. Column 3, line 42, for "not given" read -- not give --. Column 4, line 72, for "concnetrated" read -- concentrated --. Column 5, line 7, for "solutions" read -- solution --; lines 15-16, for "treatment of" read -- treating a --; line 21, for "acid in" read -- acid is --. Column 6, line 17, for "3,300,381" read -- 3,300,382 --.

Signed and sealed this 26th day of December 1972.

(SEAL)
Attest:

EDWARD M. FLETCHER, JR.
Attesting Officer

ROBERT GOTTSCHALK
Commissioner of Patents